US011943593B2

(12) United States Patent
Campbell et al.

(10) Patent No.: US 11,943,593 B2
(45) Date of Patent: Mar. 26, 2024

(54) INTEGRATED AUDIO PAGING CONFIGURATION

(71) Applicant: Biamp Systems, LLC, Beaverton, OR (US)

(72) Inventors: Jacob Peter Campbell, Beaverton, OR (US); Bruce Maxwell Goldburg, Keperra (AU); Patrick W. White, Aloha, OR (US); Dale Irving, Oregon City, OR (US); Paul Hand, Sherwood, OR (US); Martin Bomber, Beaverton, OR (US)

(73) Assignee: Biamp Systems, LLC, Beaverton, OR (US)

( * ) Notice: Subject to any disclaimer, the term of this patent is extended or adjusted under 35 U.S.C. 154(b) by 16 days.

(21) Appl. No.: 17/580,478

(22) Filed: Jan. 20, 2022

(65) Prior Publication Data

US 2022/0232322 A1 Jul. 21, 2022

Related U.S. Application Data

(60) Provisional application No. 63/139,798, filed on Jan. 21, 2021.

(51) Int. Cl.
*H04R 27/00* (2006.01)
*H04R 3/12* (2006.01)

(52) U.S. Cl.
CPC ............... *H04R 3/12* (2013.01); *H04R 27/00* (2013.01); *H04R 2227/003* (2013.01)

(58) Field of Classification Search
CPC .... H04R 3/12; H04R 27/00; H04R 2227/003; H04W 68/005
USPC ...................................................... 381/77–82
See application file for complete search history.

(56) References Cited

U.S. PATENT DOCUMENTS

| | | | | |
|---|---|---|---|---|
| RE44,611 E * | 11/2013 | Metcalf | H04S 7/30 | 381/17 |
| 8,599,724 B2 * | 12/2013 | Packer | H04R 27/00 | 370/432 |
| 9,742,797 B2 * | 8/2017 | Shin | H04L 63/1458 | |
| 9,774,966 B1 * | 9/2017 | Budny | H04R 27/00 | |
| 9,792,797 B2 * | 10/2017 | Agrawal | G08B 21/02 | |
| 10,587,693 B2 * | 3/2020 | Beckhardt | G06Q 50/01 | |
| 11,778,378 B2 * | 10/2023 | Agustin | H03G 3/3005 | 381/77 |
| 2015/0031323 A1 * | 1/2015 | Hawkes | H04W 12/10 | 455/404.2 |
| 2020/0244789 A1 * | 7/2020 | Watson | H04W 76/36 | |

* cited by examiner

*Primary Examiner* — Disler Paul

(57) ABSTRACT

An example may include receiving a page code identifier, determining a priority of the page code identifier, queuing the page code identifier in a paging queue, retrieving content associated with the page code, and forwarding the content to one or more audio devices identified by the page code identifier when the page code has reached a top of the queue.

20 Claims, 11 Drawing Sheets

600

INTEGRATED AUDIO PAGING CONFIGURATION

CROSS-REFERENCE TO RELATED APPLICATIONS

This application claims priority to earlier filed provisional Patent application No. 63/139,798, entitled "PAGING INTEGRATED AUDIO CONFIGURATION" and filed on Jan. 21, 2021, the entire contents of which are hereby incorporated by reference.

BACKGROUND

In a workplace, conference area, public forum or other environment, the audio producing speakers may be arranged in a networked configuration that covers multiple floors, areas and different sized rooms. Tuning the audio at most locations has presented a challenge to the manufacturers and design teams of such large-scale audio systems. More advanced tuning efforts, such as combining a paging feature with a native audio network presents further challenges to the setup and configuration processes.

Paging configurations have security requirements and are limited in their ability to receive and process audio sounds. Also, a large-scale paging system may require additional capabilities, such as retrieving customized audio, storing audio, permitting live audio, etc.

SUMMARY

One example embodiment may provide a method that includes receiving a pin number at a paging station interface, responsive to confirming the pin authorization, prompting the interface to initiate a paging function, receiving a paging function selection comprising one or more of live audio and recorded audio, providing a zone busy feedback notification when a requested zone is awaiting a free period of communication, forwarding one or more of the live audio and the recorded audio after the free period of communication has initiated.

Another example embodiment may include a process that includes one or more of receiving a page code identifier, determining a priority of the page code identifier, queuing the page code identifier in a paging queue, retrieving content associated with the page code, and forwarding the content to one or more audio devices identified by the page code identifier when the page code has reached a top of the queue.

Another example embodiment may include an apparatus that includes a receiver configured to receive a page code identifier, and a processor configured to determine a priority of the page code identifier, queue the page code identifier in a paging queue, retrieve content associated with the page code, and forward the content to one or more audio devices identified by the page code identifier when the page code has reached a top of the queue.

Another example embodiment may include a non-transitory computer readable storage medium configured to store instructions that when executed cause a processor to perform receiving a page code identifier, determining a priority of the page code identifier, queuing the page code identifier in a paging queue, retrieving content associated with the page code, and forwarding the content to one or more audio devices identified by the page code identifier when the page code has reached a top of the queue.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a system that includes a controller or central computer system to manage an audio configuration including, for example, a plurality of microphones, paging devices and/or loudspeakers, and to provide audio paging in a particular environment. An audio system may include tuning procedures to tune parameters to control various levels, equalization, speaker power level (SPL), compression, etc., which may include multiple microphones, loudspeakers and/or zones, and which may use components normally needed by an audio system and without other types of measurement instrumentation. A paging system may be overlaid on the audio system for added functionality.

Figure 1A:
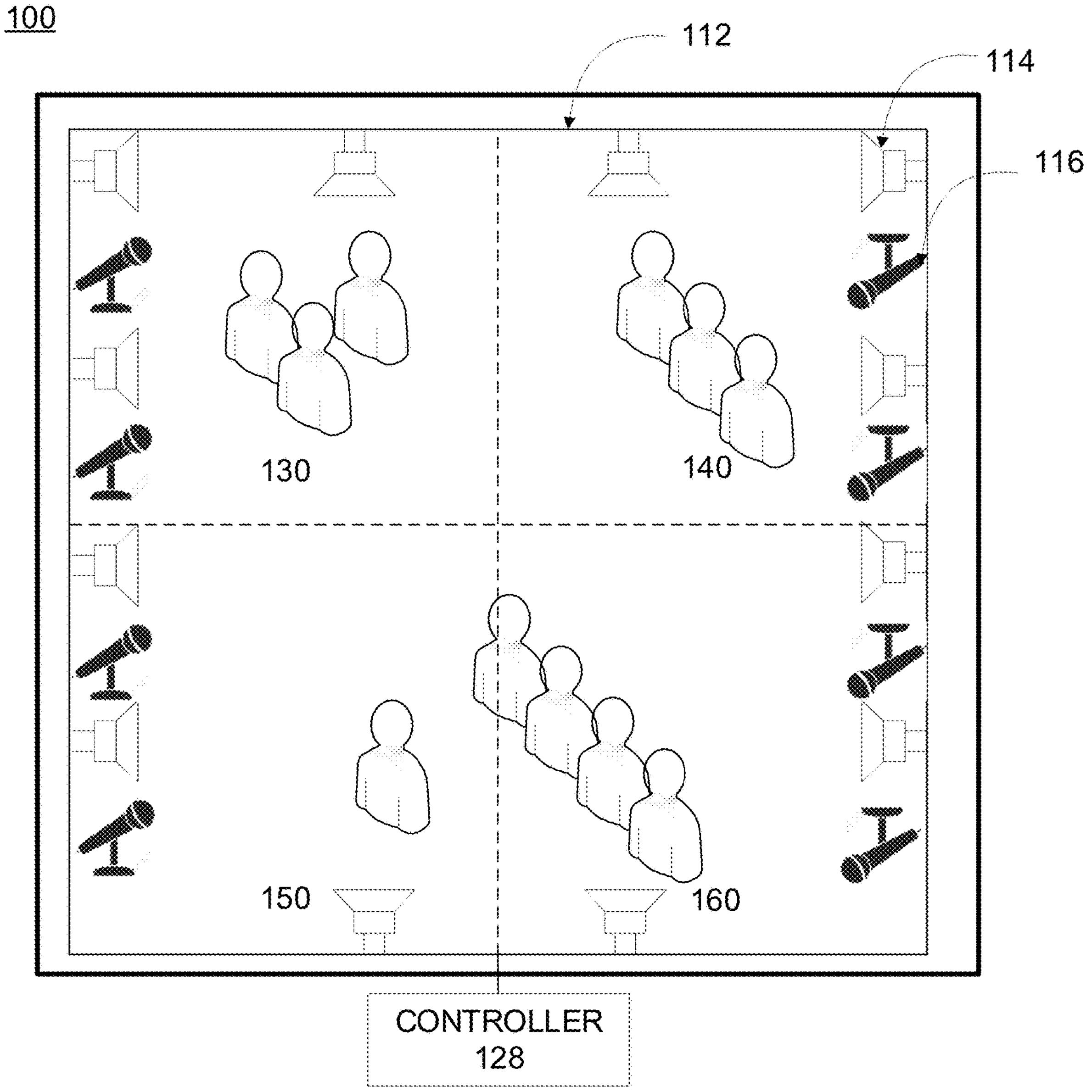
FIG. 1A illustrates a controlled speaker and microphone environment according to example embodiments.

FIG. 1A illustrates a controlled speaker and microphone environment according to example embodiments. Referring to FIG. 1A, the illustration 100 demonstrates an audio-controlled environment 112 which may have any number of speakers 114 and microphones 116 to detect audio, play audio, replay audio, adjust audio output levels, etc., via an automated tuning procedure. The configuration 100 may include various different areas 130-160 separated by space, walls and/or floors. The controller 128 may be in communication with all the audio elements and may include a computer, a processor, a software application, etc., setup to receive and produce audio, etc. In this example, a chirp response measurement technique may be used to acquire a frequency response by measurement of a loudspeaker. Also, the controller 128 may administer paging audio to one or more areas 130-160 via the one or more loudspeakers "speakers" 114.

With regard to a setup process, a launch button (e.g., auto setup+auto tuning) on a user interface may provide a way to test the sound profile of the room including the speakers and microphones and their respective operations. Network discovery can be used to find devices plugged-in and included in a list of system devices, and to provide them with a baseline configuration to initiate operation. The audio system may be realized in a graphical user interface format during a device discovery process, the operator can then drag and drop data in a user interface for a more customizable experience, or reset to a factory default level. If the system did not adequately tune to a certain level, then an alert can be generated and any miswirings can be discovered as well by a testing signal sent to all known devices.

The audio environments normally include various components and devices such as microphones, amplifiers, loudspeakers, DSP devices, etc. After installation, the devices need to be configured to act as a system. The software may be used to configure certain functions performed by each device. The controller 128 or central computing device may store a configuration file which can be updated during the installation process to include a newly discovered audio profile.

One approach to performing the automated tuning process may include permitting auto tune algorithms to execute on a device that also contains custom DSP processing procedures. To enable this combined feature, the code would discover the appropriate signal injection and monitoring points within the custom configuration. With the injection and monitoring points identified, a selected DSP processing layout would be tuning compatible. Some operations in the auto tune process will send test signals out of each speaker one at a time, which increases total measurement time when many speakers are present.

Figure 1B:
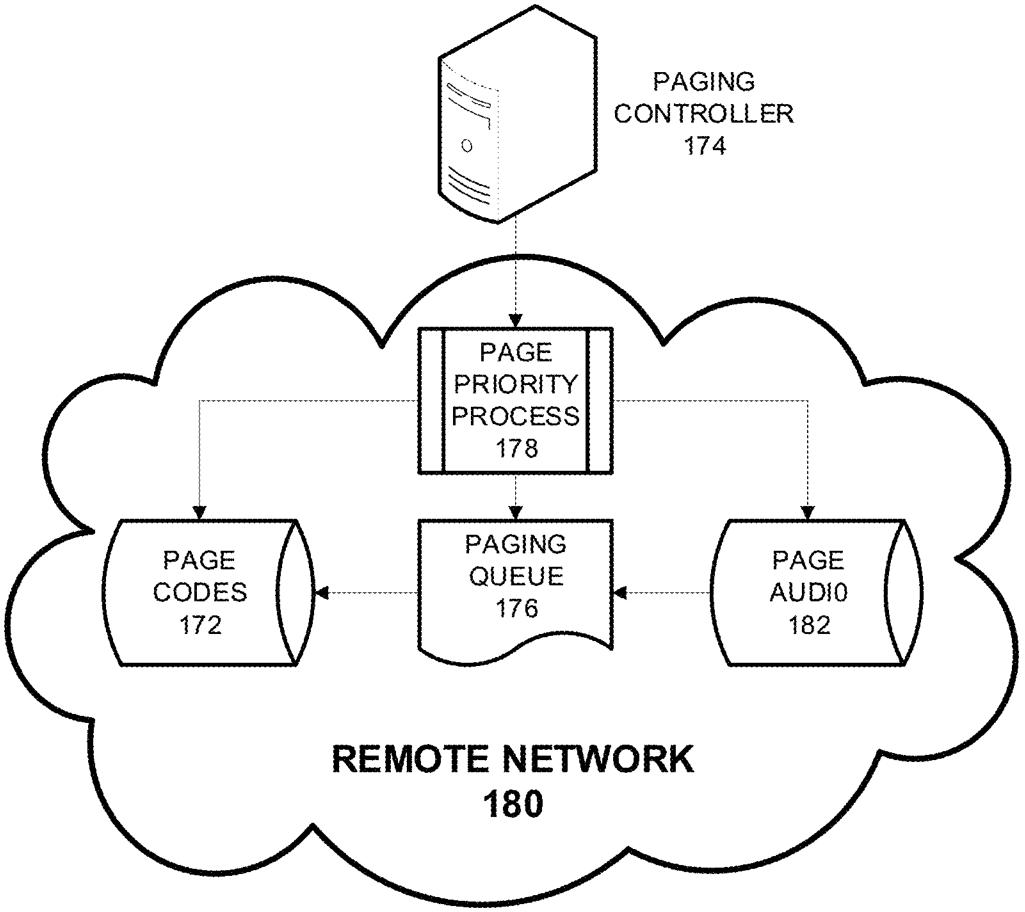
FIG. 1B illustrates a data network configuration for managing paging operations according to example embodiments.

FIG. 1B illustrates a data network configuration for managing paging operations according to example embodiments. Referring to FIG. 1B, the data management process may be managed by a paging controller device 174, such as a computer, server or similar device. The controller 174 may provide a user interface that permits a user to login or authorize their credentials, select paging modes of operation, and provide paging codes which may have a priority assignment and which are identified as being associated with a live or a pre-recorded audio signal. The code entered may be identified by the page priority process 178 which may be a process associated with a database of pages codes 172 and page audio 182 stored in a local memory or a network cloud of a remote network 180. When the code is identified, the code may be placed in a paging queue 176 of pending pages, which may include zero or more other pages which are pending to be played by one or more zones.

Each page in a paging queue may include a code that corresponds to the page audio and a paging priority. The code may be further identified by a type of page (e.g., live, pre-recorded voice, emergency signal, etc.). The queue may include the code, the identifier of the audio to play and a location in the queue. When the page code is at the top of the queue, the codes may be used to select the audio and the specific zones to play the paging audio. For example, a page code of '348' may indicate a routine recording 'ABC' that is part of an airport paging system to remind passengers to secure their belongings for security reasons and report suspicious behavior. The priority of the page may be 'high' and may move the page to the next page position in the queue behind the first place position. The page may be identified by a priority level, its recording content and its zone(s) (1-5, etc.). The security page may be an omnibus page that includes all zones at a maximum volume designation as well (1-10).

Figure 1C:
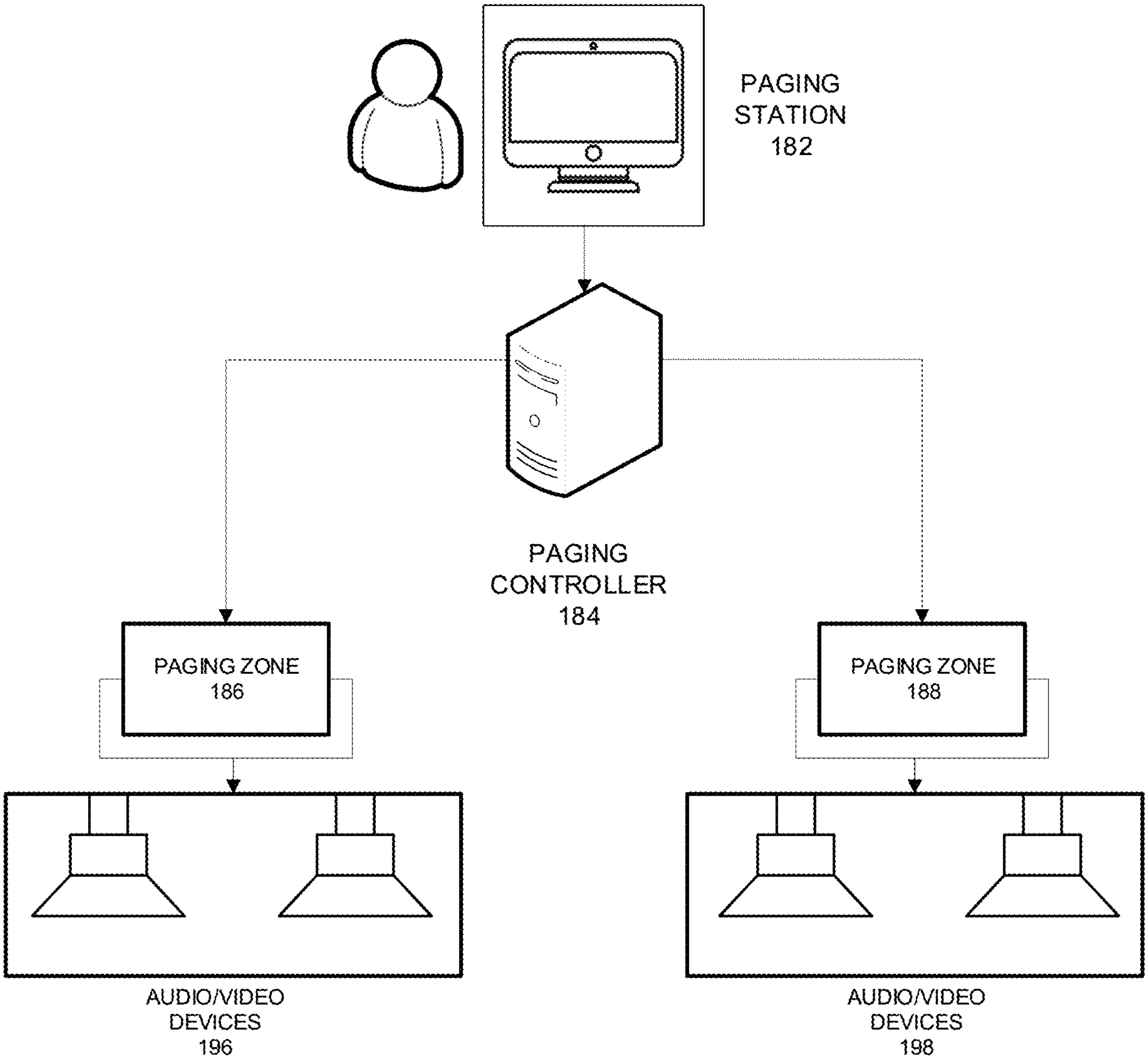
FIG. 1C illustrates a paging configuration for conducting paging operations according to example embodiments.

FIG. 1C illustrates a paging configuration for conducting paging operations according to example embodiments. Referring to FIG. 1C, the paging station 182 may include a computer and display interface for a user to operate the paging system. The paging controller 184 may be the same or a different computer that provides electrical signals to the paging zone devices 186 and 188, which may be the single output device for one or more respective audio devices 196 and 198. For example, a paging station operation may include a selection for a high priority page to a specific area managed by the paging zone 188. The paging controller may store the paging code and associated audio in a page queue and forward the audio to the paging zone 188 when the page has matured in the queue (reached a top position) and/or at a particular time. The audio devices 198 linked to the paging zone 188 will then produce the audio at the appropriate time.

Figure 2:
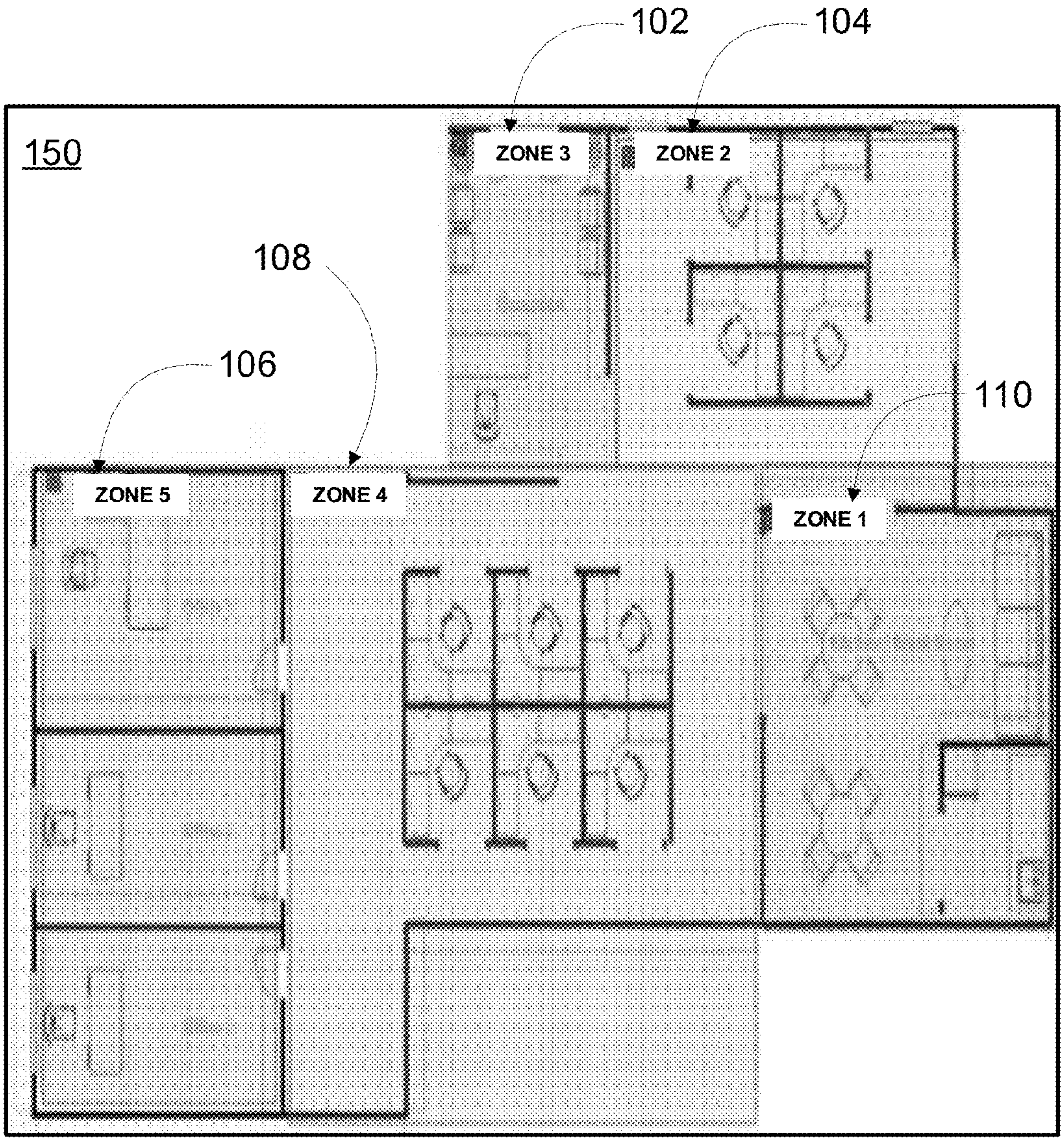
FIG. 2 illustrates a controlled paging environment according to example embodiments.

FIG. 2 illustrates a data network configuration for managing paging operations according to example embodiments. Referring to FIG. 2, the environment 150 that may be subject to paging operations and may include various different zones 102-110 (e.g., zones 1-5) which are defined by temporary walls, permanent structures or just general areas without walls or defining structures. The zones may include any number of speakers which are in communication with the paging network. The speakers may be wireless or wired and may receive paging audio signals at certain designated speakers depending on the configuration. Certain speakers may receive no signal, other speakers may receive a paging audio signal, such as a pre-recorded audio signal or live voice signal, and others may receive a different signal, such as white noise, background noise, music, or a similar pre-recorded voice audio signal. The objective may include forwarding a paging signal to one or more areas while limiting audio and signals forwarded to other areas.

Figure 3:
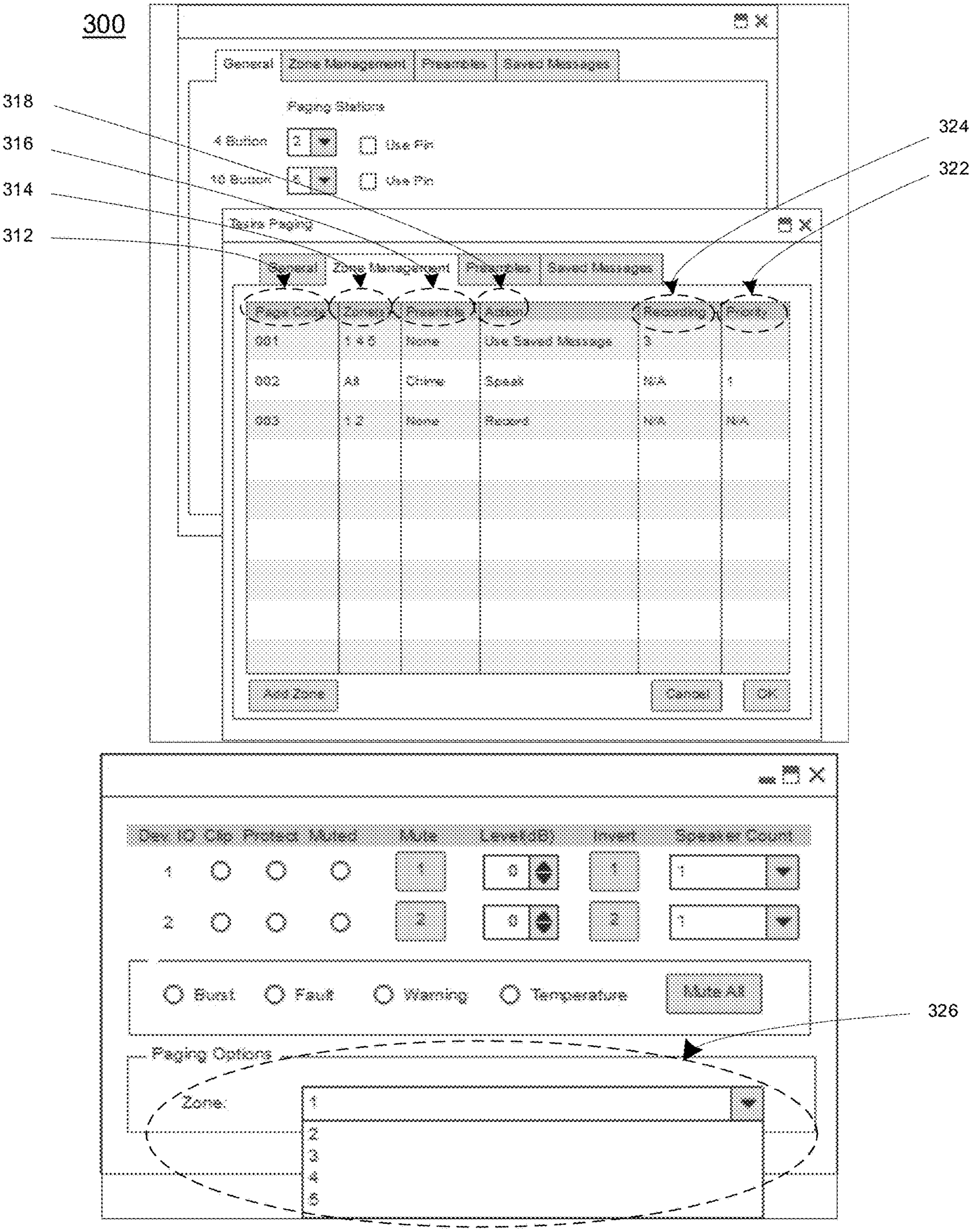
FIG. 3 illustrates a user interface for managing a paging system according to example embodiments.

FIG. 3 illustrates a user interface application with a series of options to select for paging setup according to example embodiments. Referring to FIG. 3, the software application may offer a configuration interface 300 to establish a number of paging input channels for a particular paging mixer along with other options. One input selection may be a page code 312, which identifies a priority, a type of audio to play and may include a security feature that permits the page when the code is received. Another option is the zone 314, which may include one or more zones available to play the page audio, such as zones '1', '2', '3', 'ALL ZONES', etc. Any combination of zones is possible for playing the page audio. Another option is the preamble 316 which may include an introduction, such as a chime, a harsh alert sound, or nothing at all. The option for a particular action 318 may include a recorded message, a direct audio speech input 'live audio', or other recording. Another option is the recording 324, such as a particular file or name, and a priority 322, such as 1, 2, 3, 4, or none. The priority assigned to the entered paging code will move the paging audio up or down the paging queue prior to the delivery of the audio. In another menu option, the paging zones 326 may be selected along with volume, muting and speaker selection options.

Figure 4A:
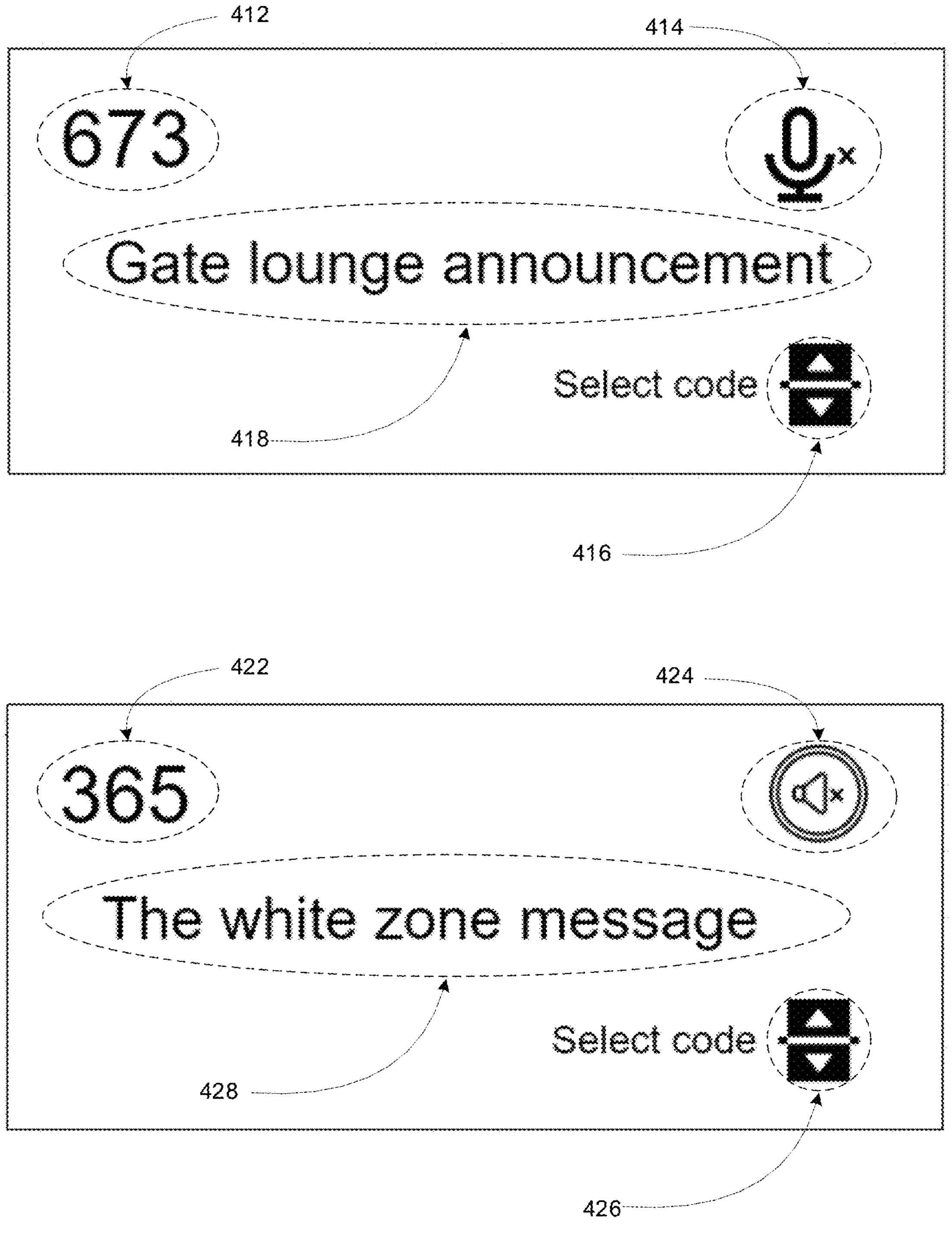
FIG. 4A illustrates user interfaces for establishing a paging operation according to example embodiments.

FIG. 4A illustrates user interfaces for establishing a paging operation according to example embodiments. Referring to FIG. 4A, the example interfaces demonstrate a page code identifier 412/422 that is used to identify a particular page vs. another page, a label 418, which is a title that describes the type of page, in this case an announcement for a gate at an airport or similar facility. Another feature may include a code selection option 416/426 used to identify and browse code identifiers, and an announcement type, such as a recording indicating by a speaker 424, or a live announcement indicated by a microphone 414. The 'x' in the examples 414 and 424 indicate a mute option on the microphone 414 or the speaker. In the second example of FIG. 4A, the label 365 indicates a white zone message type 428.

Figure 4B:
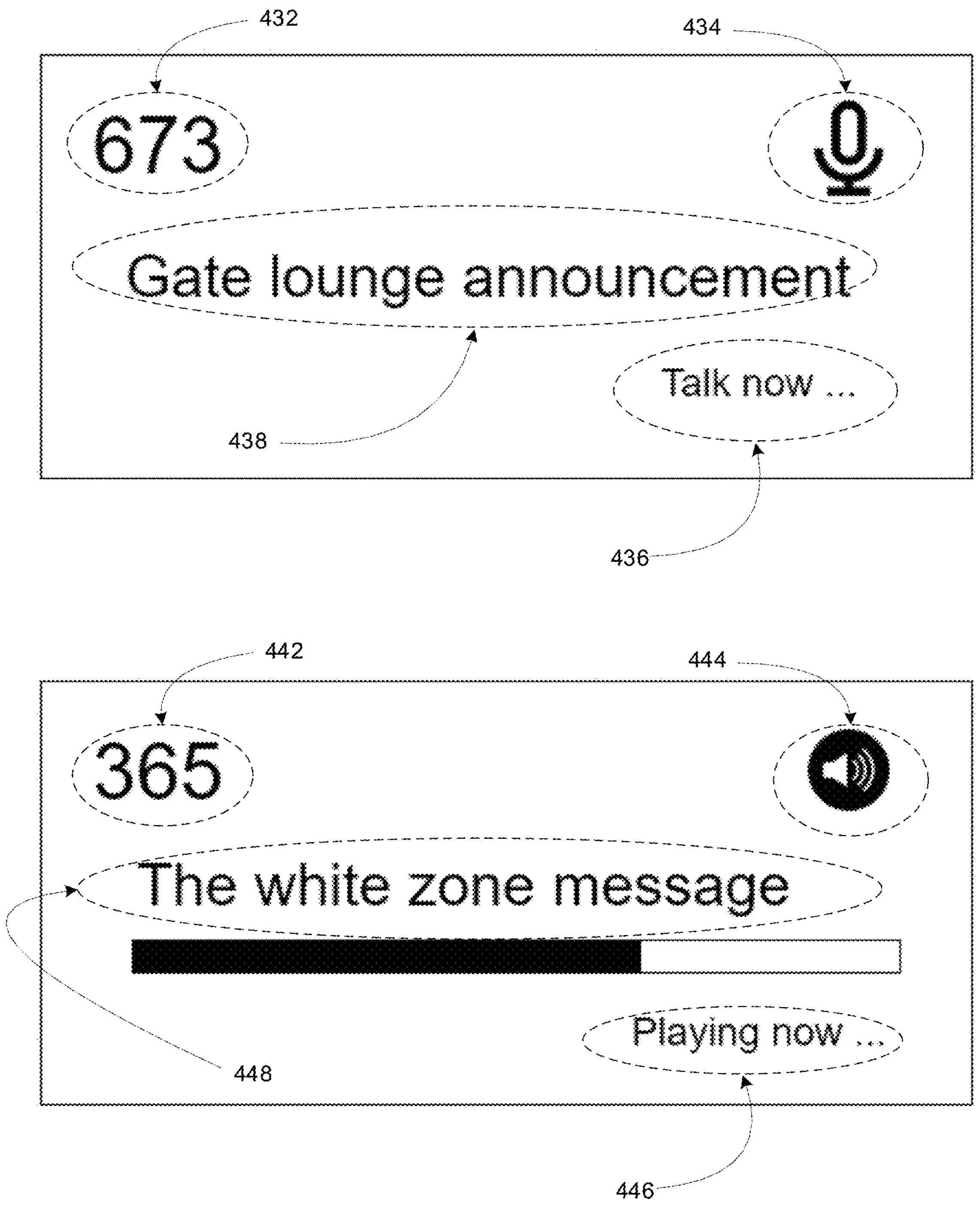
FIG. 4B illustrates additional user interfaces for establishing a paging operation according to example embodiments.

FIG. 4B illustrates additional user interfaces for establishing a paging operation according to example embodiments. Referring to FIG. 4B, the first menu option now indicates a live microphone 434 with the same identifier '673' 432 and label 438 gate lounge announcement. The option to talk now 436 is a prompt for the user to begin speaking. In the second example, the identifier 442 is the same white noise message, and in this example, the status is now 'playing' 446 and the speaker 444 is active and not muted. Also, a status bar indicates how much of the message is left to be played for the white zone message example 448.

Figure 4C:
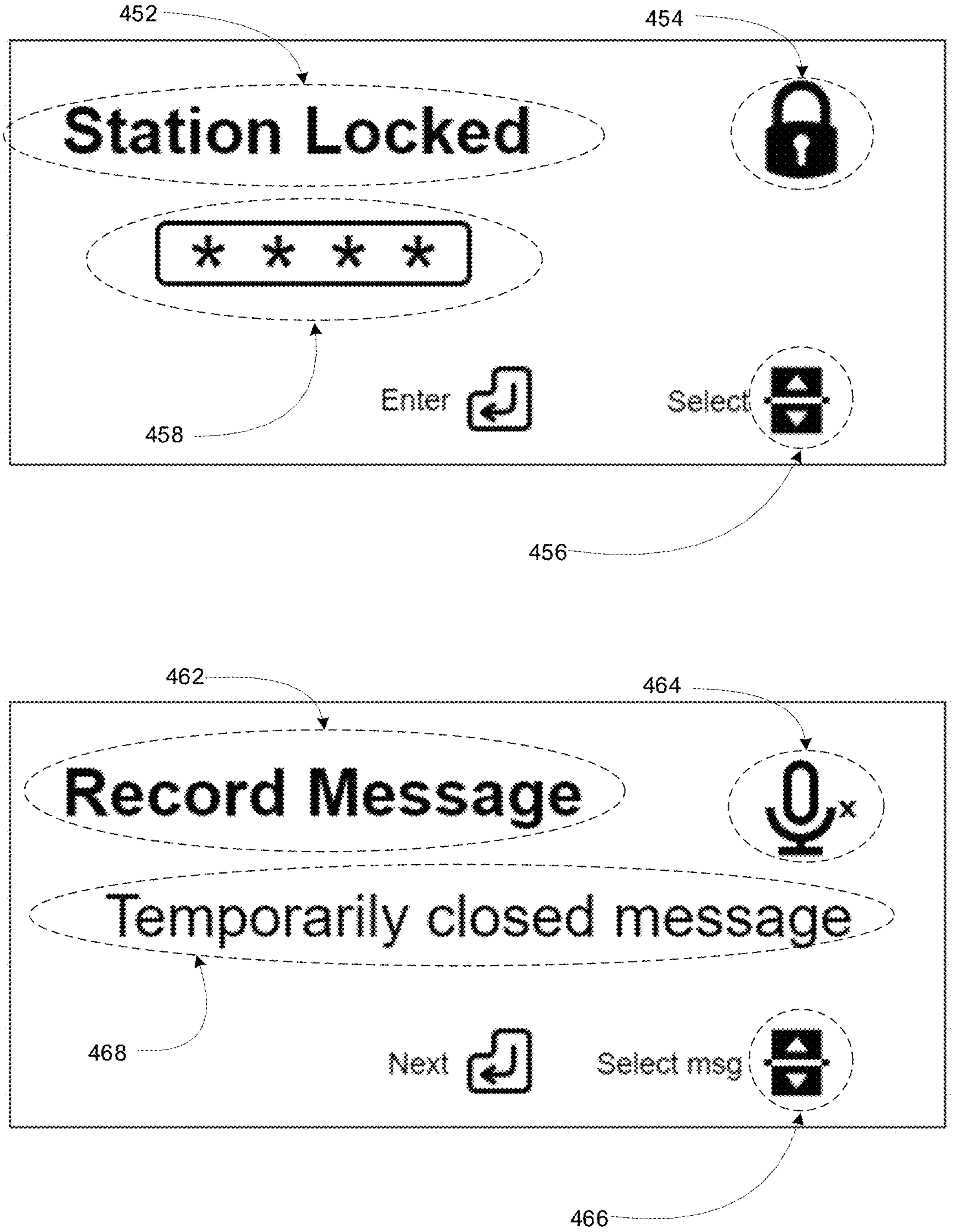
FIG. 4C illustrates further user interfaces for establishing a paging operation according to example embodiments.

FIG. 4C illustrates further user interfaces for establishing a paging operation according to example embodiments. Referring to FIG. 4C, the first interface example indicates that the station is locked 452 until the correct pin number is entered 458. The status may indicate a locked symbol 454 until the correct information is received. The option 456 to select different codes and options is also provided. In the second example interface, the station is being used to record a new message 462, the status is temporarily closed 468 and the microphone is off 464 until the message is created and selected 466.

Figure 5A:
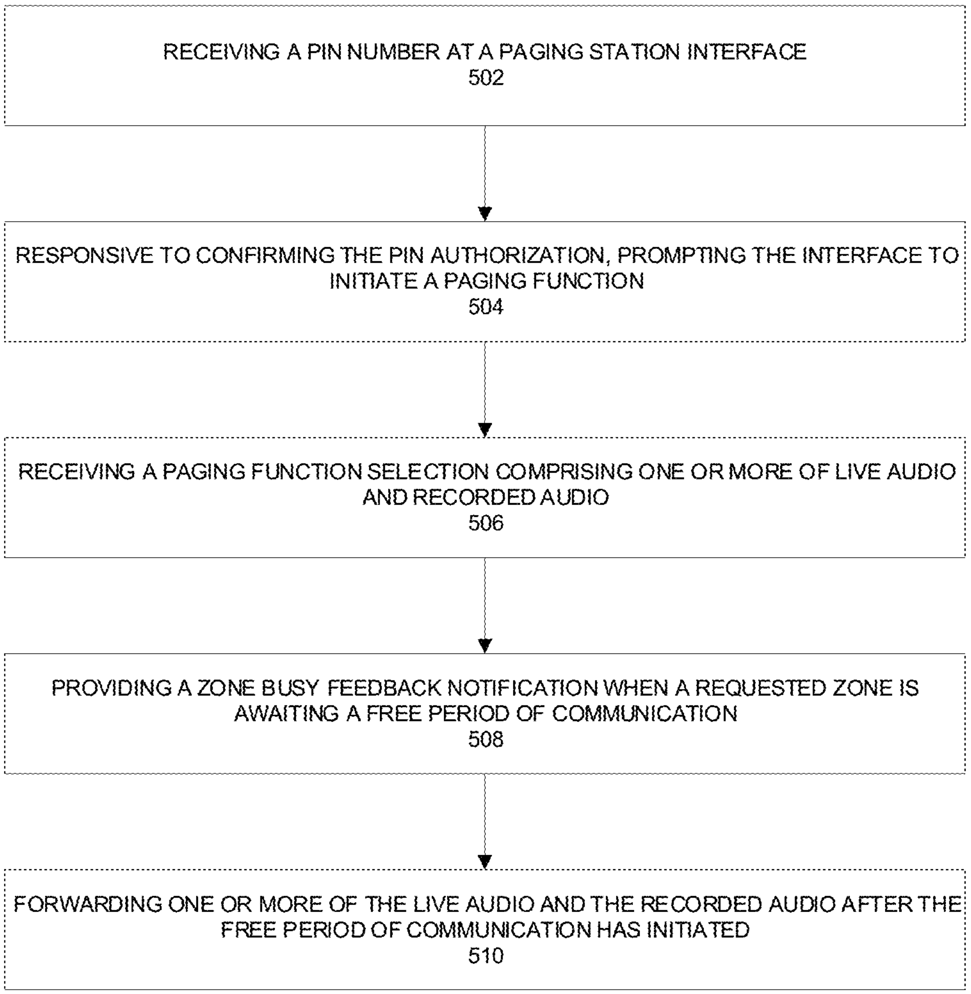
FIG. 5A illustrates an example logic diagram of an example process of operating the paging function of the audio configuration according to example embodiments.

FIG. 5A illustrates a process for a paging selection operation. Referring to FIG. 5A, the process may include receiving a pin number at a paging station interface 502, the pin may be selected in real-time by a user or via an automated paging process that cycles certain pin number inputs at certain times of a day. The process also includes responsive to confirming the pin authorization, prompting the interface to initiate a paging function 504, receiving a paging function selection, such as one or more of live audio and recorded audio 506, providing a zone busy feedback notification when a requested zone is awaiting a free period of communication 508, and forwarding one or more of the live audio and the recorded audio after the free period of communication has initiated 510.

Figure 5B:
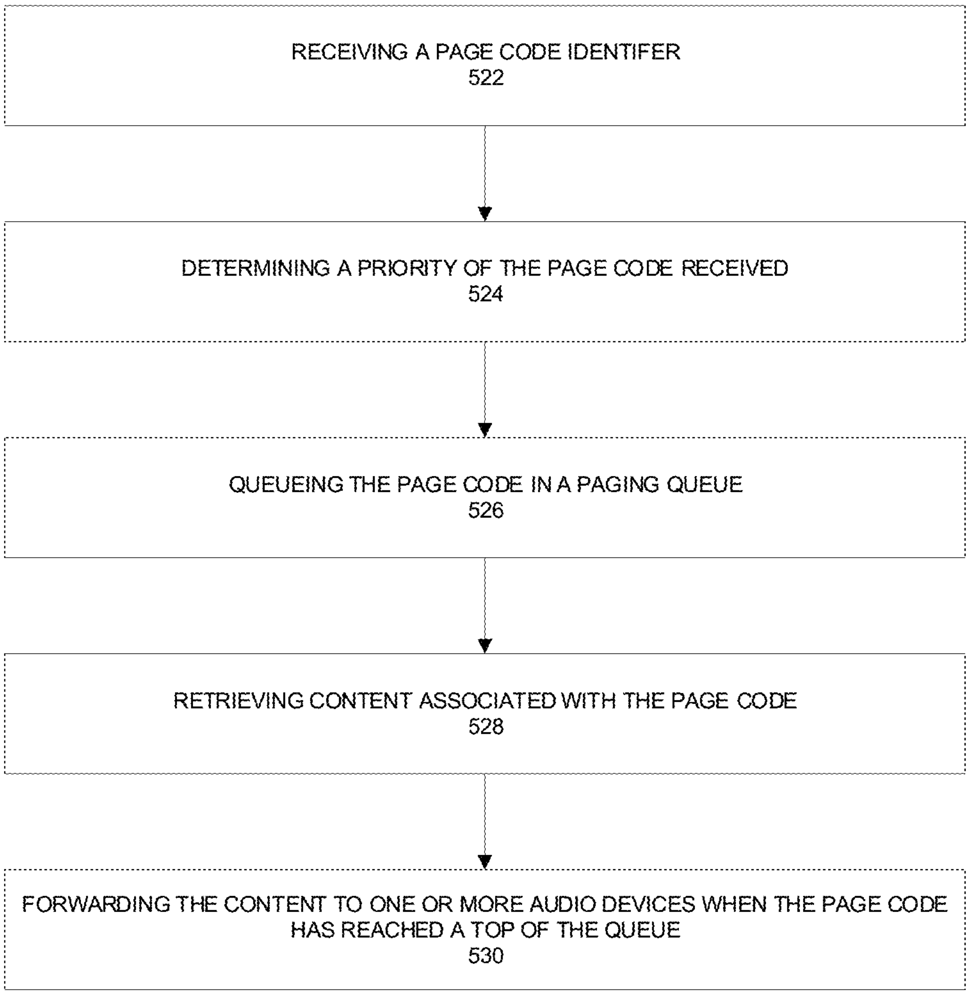
FIG. 5B illustrates an example logic diagram of an example process of operating the paging function of the audio configuration according to example embodiments.

FIG. 5B illustrates an example logic diagram of an example process of operating the paging function of the audio configuration according to example embodiments. Referring to FIG. 5B, process may include receiving a page code identifier 522, determining a priority of the page code identifier 524, queuing the page code identifier in a paging queue 526, retrieving content associated with the page code 528, and forwarding the content to the one or more audio devices when the page code has reached a top of the queue 530. The content and the one or more audio devices which are selected may be based on the code. The code may indicate priority, specific zones, speakers to output the announcement, speakers to not output the announcement, importance, the type of preamble to use, the amount of time to store and/or delay the announcement/page, etc.

The process may also include determining whether the page code identifier indicates live or recorded audio, and initiating a content retrieval operation when the page code identifier indicates recorded audio. Also, the process may perform determining whether the page code identifier indicates live or recorded audio, and initiating a recording operation when the page code identifier indicates live audio. The process may also include determining the priority of the page code identifier comprises matching the page code identifier with a priority stored in a table. The queuing the page code identifier in the paging queue may include storing the page code identifier with the content to be forwarded to the one or more audio devices. The queuing the page code identifier in the paging queue may include storing the page identifier with the content to be forwarded to the one or more audio devices in a second queue position when the page code identifier is associated with a higher priority than all other page codes stored in the page queue. The process may also include identifying the page code identifier comprises a same priority as one or more other page code identifiers in the page queue, determining a station identifier associated with the page code identifier has a higher priority than station identifiers associated with the one or more page code identifiers, and storing the page identifier with the content to be forwarded to the one or more audio devices in a first queue position when the station code identifier is associated with a higher priority than the station identifiers associated with the one or more page code identifiers.

The paging station may satisfy the need for a convenience paging station solution for legacy audio equipment. The paging system may be a networked appliance with a microphone and press-to-talk button for making voice announcements to pre-configured destination paging zones. The types of stations may be constructed as a 4-button or a-10 button (keypad) variant. The buttons will be used to select the destination for voice announcements and recorded messages.

A push-to-talk button shall be used to initiate all announcements. An LCD (display) on the front panel of the paging station will be used to select a page code for subsequent paging operations, provide visual prompts to the user regarding page progress, report faults and display system status, provide a user interface for recording announcements to local storage and configure push-to-talk button mode. Up, down and select navigation buttons adjacent to the display shall be used to navigate the system of menus that constitute the user interface for the device.

A RESTful application programming interface 'API', accessible via the network interface, may provide a mechanism for configuring, controlling and monitoring the operation of the paging station. This API will be used by a server device to configure the paging system when it forms part of the audio network. A priority level shall be associated with each page code representing its relative importance. The priority will be an unsigned integer ranging from 1 to 16, where 16 represents the highest priority. The hardware design shall permit for onboard digital signal processing of the microphone audio input signal. The firmware permits parameters associated with each digital signal processing entity/block, such as the paging controller 184 and the paging zones 186/188 to be controlled via the API. The paging station(s) will be discoverable using the industry standard domain name service/service discovery mDNS/DNS-SD protocols. This will enable another network node to determine its IP address and the services it supports. Once the device's IP address is known, the RESTful API can be used to configure, control or monitor the device. When used as part of an audio system, discovery, configuration and monitoring of a device will be managed by the server class device acting as a proxy. The software will be used to create a layout that defines page codes and zones used by the system. The page codes will be allocated to the paging stations. In the case of the four-button configuration the page codes shall be allocated to specific buttons.

The paging station shall be capable of both live and recorded voice announcements into the local sound re-enforcement system. The type of page (live or recorded) shall be determined by the page code selected on the front panel of the device. The paging station will be the source for all paging audio associated with announcements initiated from the station whether they are live or recorded. Live announcements will use audio from a gooseneck or hand-held microphone attached to the station. Recorded announcements will be stored on the local file system of the station and be played out upon request. Audio will be delivered to audio output devices via its networked audio port.

The push-to-talk button (PTT) on the front panel of the paging station shall operate in one of two modes: momentary or latching. The mode of operation shall be selectable via a menu on the station's front panel display. When the momentary mode is selected the user must hold down the PTT for the duration of the page. The latching mode allows the user to press and release the PTT once to initiate the page then press and release again to terminate it. It shall be possible to disable selection of the latching mode at the station, via a configuration time option. In this case the press-to-talk will always operate in the momentary fashion.

All pages may be proceeded by a preamble chime or message. The preamble shall be enabled and the desired message file selected as part of the page code configuration (see Preambles). Five pre-loaded preambles will be provided with the station. Other preambles can be uploaded to the device via the REST API. The REST API shall provide a mechanism for triggering recorded announcement playback. It shall be possible to select the message file, destination zones and the priority of the announcement using this API. A four-digit PIN shall be used to authenticate paging station users. It shall be entered using the page code selection buttons on the front panel of the station. The PIN shall be entered on a four-button variant of the station using a combination of the page code selection buttons (to select the digit to enter) and the Up and Down navigate keys. The 10-button interface provides a numeric keypad for entering the PIN. The convenience paging station shall implement an intuitive wait to talk/ready to talk indication so a user who is waiting to give an announcement can easily understand when it is time to being speaking. The paging station shall provide a "zone busy" feedback notification to ensure the user is aware about zone readiness conflicts. This will be visible as soon as the page code is selected.

When two pages with overlapping zone sets occur, the page code with the highest priority shall override the lower priority one. If the higher priority page starts before the lower priority one, then the paging station attempting to initiate the lower priority page will be disallowed—even if only one destination zone overlaps. If the lower priority page starts first, it shall be allowed to continue after the higher priority page starts, so long as it has at least one non-overlapping zone. If two pages with overlapping zones are started and the have the same priority, then the first to start will be treated like a higher priority page. The second will be disallowed. It is the selected page code that determines if a preamble chime will be played prior to the announcement. If the page code preamble enabled attribute is true, then a preamble will be used and the desired preamble message must be specified. The preamble message can be one of the five preloaded chimes or one of the user provided preamble message files uploaded via the REST API.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
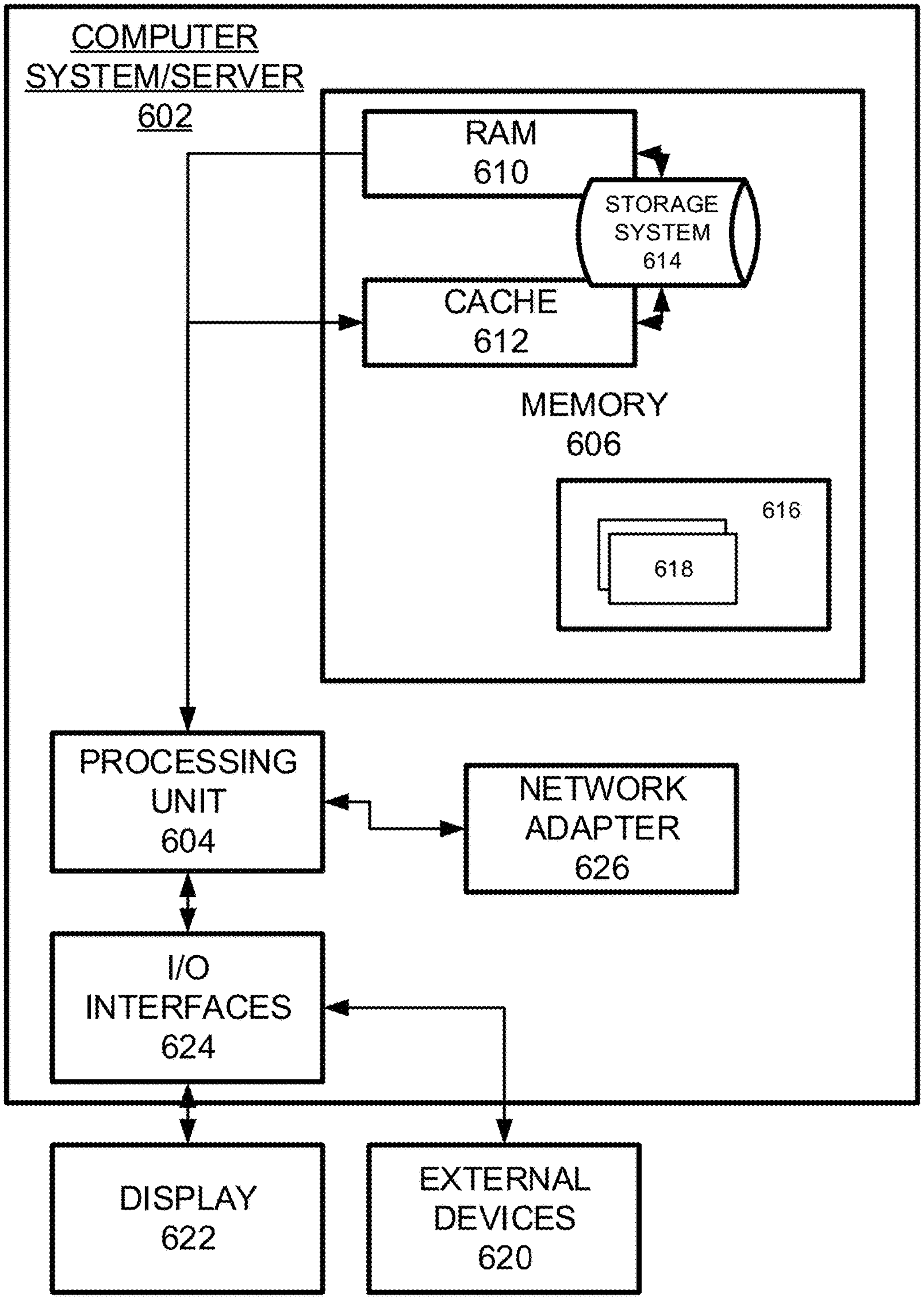
FIG. 6 illustrates a system configuration for storing and executing the automatic tuning procedure.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 6, computer system/server 602 in cloud computing node 600 is displayed in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not displayed, other hardware and/or software components could be used in conjunction with computer system/server 602. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:

receiving, at a computer controller device, a page code identifier as a numerical code;

determining, via the computer controller device, a priority of the page code identifier by initiating a page priority process to identify the priority from a database of page codes, content identified by the page code identifier, and a portion of zones to play the content based on the page code identifier;

queuing, via the computer controller device, the page code identifier and corresponding audio to be played in a paging queue based on the priority, wherein the position the page code identifier is placed in the paging queue is based on a priority associated with the page code identifier; and forwarding, via the computer controller device, the content and a volume level to play the audio to one or more audio devices located in the portion of zones identified by the page code identifier when the page code identifier has reached a top of the queue.

2. The method of claim 1, comprising determining whether the page code identifier indicates live or recorded audio; and initiating a content retrieval operation when the page code identifier indicates recorded audio.

3. The method of claim 1, comprising determining whether the page code identifier indicates live or recorded audio; and initiating a recording operation when the page code identifier indicates live audio.

4. The method of claim 1, wherein the determining the priority of the page code identifier comprises matching the page code identifier with a priority stored in a table.

5. The method of claim 1, wherein the queuing the page code identifier in the paging queue comprising storing the page code identifier with the content to be forwarded to the one or more audio devices.

6. The method of claim 1, wherein the queuing the page code identifier in the paging queue comprising storing the page identifier with the content to be forwarded to the one or more audio devices in a second queue position when the page code identifier is associated with a higher priority than all other page codes stored in the page queue.

7. The method of claim 1, comprising identifying the page code identifier comprises a same priority as one or more other page code identifiers in the page queue;

determining a station identifier associated with the page code identifier has a higher priority than station identifiers associated with the one or more other page code identifiers; and storing the page identifier with the content to be forwarded to the one or more audio devices in a first queue position when the station code identifier is associated with a higher priority than the station identifiers associated with the one or more other page code identifiers.

8. An apparatus, comprising:

a receiver configured to receive a page code identifier as a numerical code; and a processor configured to determine a priority of the page code identifier by initiating a page priority process to identify the priority from a database of page codes, content identified by the page code identifier, and a portion of zones to play the content based on the page code identifier;

queue the page code identifier and corresponding audio to be played in a paging queue based on the priority, wherein the position the page code identifier is placed in the paging queue is based on a priority associated with the page code identifier; and forward the content and a volume level to play the audio to one or more audio devices located in the portion of zones identified by the page code identifier when the page code identifier has reached a top of the queue.

9. The apparatus of claim 8, wherein the processor is further configured to determine whether the page code identifier indicates live or recorded audio; and initiate a content retrieval operation when the page code identifier indicates recorded audio.

10. The apparatus of claim 8, wherein the processor is further configured to determine whether the page code identifier indicates live or recorded audio; and initiate a recording operation when the page code identifier indicates live audio.

11. The apparatus of claim 8, wherein the determination as to the priority of the page code identifier comprises the processor being configured to match the page code identifier with a priority stored in a table.

12. The apparatus of claim 8, wherein the processor being configured to queue the page code identifier in the paging queue comprises the processor being configured to store the page code identifier with the content to be forwarded to the one or more audio devices.

13. The apparatus of claim 8, wherein the page code identifier being queued in the paging queue comprises the processor being configured to store the page identifier with the content to be forwarded to the one or more audio devices in a second queue position when the page code identifier is associated with a higher priority than all other page codes stored in the page queue.

14. The apparatus of claim 8, wherein the processor is further configured to identify the page code identifier comprises a same priority as one or more other page code identifiers in the page queue;

determine a station identifier associated with the page code identifier has a higher priority than station identifiers associated with the one or more other page code identifiers; and store the page identifier with the content to be forwarded to the one or more audio devices in a first queue position when the station code identifier is associated with a higher priority than the station identifiers associated with the one or more other page code identifiers.

15. A non-transitory computer readable storage medium configured to store instructions that when executed cause a processor to perform:

receiving, at a computer controller device, a page code identifier as a numerical code;

determining, via the computer controller device, a priority of the page code identifier by initiating a page priority process to identify the priority from a database of page codes, content identified by the page code identifier, and a portion of zones to play the content based on the page code identifier;

queuing, via the computer controller device, the page code identifier and corresponding audio to be played in a paging queue based on the priority, wherein the position the page code identifier is placed in the paging queue is based on a priority associated with the page code identifier; and forwarding, via the computer controller device, the content and a volume level to play the audio to one or more audio devices located in the portion of zones identified by the page code identifier when the page code identifier has reached a top of the queue.

16. The non-transitory computer readable storage medium of claim 15, wherein the processor is further configured to perform:

determining whether the page code identifier indicates live or recorded audio; and initiating a content retrieval operation when the page code identifier indicates recorded audio.

17. The non-transitory computer readable storage medium of claim 15, wherein the processor is further configured to perform:

determining whether the page code identifier indicates live or recorded audio; and initiating a recording operation when the page code identifier indicates live audio.

18. The non-transitory computer readable storage medium of claim 15, wherein the determining the priority of the page code identifier comprises matching the page code identifier with a priority stored in a table.

19. The non-transitory computer readable storage medium of claim 15, wherein the queuing the page code identifier in the paging queue comprising storing the page code identifier with the content to be forwarded to the one or more audio devices.

20. The non-transitory computer readable storage medium of claim 15, wherein the queuing the page code identifier in the paging queue comprising storing the page identifier with the content to be forwarded to the one or more audio devices in a second queue position when the page code identifier is associated with a higher priority than all other page codes stored in the page queue.

* * * * *